United States Patent [19]
Bedford

[11] 3,742,336
[45] June 26, 1973

[54] VERSATILE CYCLOINVERTER POWER CONVERTER CIRCUITS

[75] Inventor: Burnice D. Bedford, Scotia, N.Y.

[73] Assignee: General Electric Company, Schenectady, N.Y.

[22] Filed: Nov. 24, 1971

[21] Appl. No.: 201,673

[52] U.S. Cl.................... 321/69 R, 321/5, 321/7
[51] Int. Cl. ............................................. H02m 5/30
[58] Field of Search.............................. 321/5, 7, 69

[56] References Cited
UNITED STATES PATENTS

| | | | |
|---|---|---|---|
| 3,246,231 | 4/1966 | Clarke.............................. | 321/69 R |
| 3,566,148 | 2/1971 | Wood............................... | 321/45 R |
| 3,407,349 | 10/1968 | Lehrer et al. ..................... | 321/45 R |
| 3,582,756 | 6/1971 | McMurray........................ | 321/5 |
| 3,517,300 | 6/1970 | McMurray ................... | 321/69 R X |
| 3,487,289 | 12/1969 | McMurray ................... | 321/69 R X |
| 3,564,390 | 2/1971 | Stratton .......................... | 321/69 R |

Primary Examiner—William M. Shoop, Jr.
Attorney—John F. Ahern et al.

[57] ABSTRACT

A family of high-frequency-link solid state power converters having an input and output switching circuit that function as a high frequency parallel capacitor commutated control inverter and a cycloconverter output circuit to supply variable frequency and variable voltage power to a load. The tuned commutation circuit for the inverter switches, preferably thyristors, includes commutating inductance in parallel with the commutation capacitor. By operating the inverter at a variable frequency greater than the resonant frequency, the commutating energy or commutating angle changes as a function of the load. The cycloconverter switches are phase controlled with respect to the high frequency inverter voltages. Depending on the circuit configuration, a-c or d-c supply voltage is converted to polyphase a-c, single phase a-c, or d-c output voltage, and power flow in either direction can be obtained. An application is a variable speed a-c motor drive.

26 Claims, 13 Drawing Figures

Inventor
Burnice D. Bedford
by Donald R. Campbell
His Attorney

Inventor
Burnice D. Bedford
by Ronald R. Compton
His Attorney

VERSATILE CYCLOINVERTER POWER CONVERTER CIRCUITS

BACKGROUND OF THE INVENTION

This invention relates to versatile solid state power converter circuits with a high frequency link and a pair of coordinated switching circuits that usually function as an inverter and as a cycloconverter. These power converters use unidirectional or alternating supply voltages, and produce voltage and frequency controlled polyphase, single phase, and unidirectional output voltages.

A relatively new family of solid state power conversion circuits with a high frequency transformer or capacitor link are known as the "electronic transformer" circuits. In their basic form, inverter type switching circuits at either side of the high frequency link are operated in synchronism to convert a d-c or low frequency input voltage (for example, 0–400 Hz) to a high frequency wave (for example, 10 kHz) that is reconstructed at the output with the same low frequency. Because of the high frequency link only a small transformer is required. U.S. Pat. Nos. 3,564,390; 3,517,300; and 3,487,289 relate to d-c and single phase versions using a variety of power semiconductor devices. Polyphase converters especially suitable for series capacitor commutated thyristors that produce the same low frequency output or a rectified output are disclosed in U.S. Pat. No. 3,582,756. Similar polyphase converters operated by a control computer to select the next combination of input and output side switches to minimize the net effective error between the predicted and desired output voltages are described in application Ser. No. 146,863 by William McMurray, filed May 26, 1971, now U.S. Pat. No. 3,678,367, dated July 18, 1972. These circuits advantageously obtain voltage, frequency, and phase conversion and regulation by utilizing appropriate sensing devices to supply data to a bank of firing selection computation circuits and a minimum error selector.

The present invention is directed to parallel capacitor commutated electronic transformer type circuits capable of functional flexibility not provided by other kinds of power conversion circuits. In particular, relatively simple circuits are described that are capable of polyphase a-c operation over a wide frequency and voltage range.

SUMMARY OF THE INVENTION

The new power converter circuits can be constructed in a variety of circuit configurations to convert a-c or d-c input power to a desired variable a-c output voltage waveform with a wide control range. An adjustable d-c output voltage can also be obtained. In their basic form the power converters include a pair of coordinated switching circuits that are optionally coupled together by a higher frequency coupling transformer. The first switching circuit includes a plurality of solid state switches, preferably thyristors, for converting an input electric potential to a high frequency voltage as compared to the frequency of the desired output waveform. Typically the first switching circuit is an inverter or a cycloconverter operated in inverter mode. The second switching circuit includes a plurality of phase controlled solid state switches, such as cycloconverter or a phase controlled rectifier, for converting the high frequency voltage wave to the desired output voltage waveform. A novel tuned parallel capacitor commutation circuit for turning off the appropriate solid state switches has the capability of supplying a controlled variable amount of commutating energy. This parallel resonant commutation circuit comprises a commutation capacitor and parallel commutation inductance means, which can be provided by the inductance of the coupling transformer, tuned to a predetermined resonant frequency. Firing circuits or other control means operates the first and second switching circuits in synchronism at a variable operating frequency above the resonant frequency to thereby change the net capacitive reactance of the tuned commutation circuit as a function of load. Consequently, the circuit commutating angle can be increased for larger loads simply by increasing the operating frequency.

The principal embodiments of the invention are in the form of a transformer-coupled inverter input circuit and a full or half wave cycloconverter output circuit to convert a d-c or a-c input voltage to a variable frequency, variable voltage polyphase output voltage waveform. By using a phase controlled rectifier output circuit an adjustable d-c voltage is obtained. Another embodiment has no isolation transformer and utilizes cycloconverter circuits for both the input and output conversions. Some of the embodiments are capable of bidirectional current flow and consequently can be used to supply regenerative type loads. These converters are especially suitable for lagging loads such as a variable speed a-c motor drive. An alternative technique for varying the net capacitive reactance of the commutation circuit, which improves the overall power factor, is to operate the converter at a constant frequency and phase control an auxiliary parallel commutating inductor.

DESCRIPTION OF THE PREFERRED EMBODIMENTS

Figure 1:
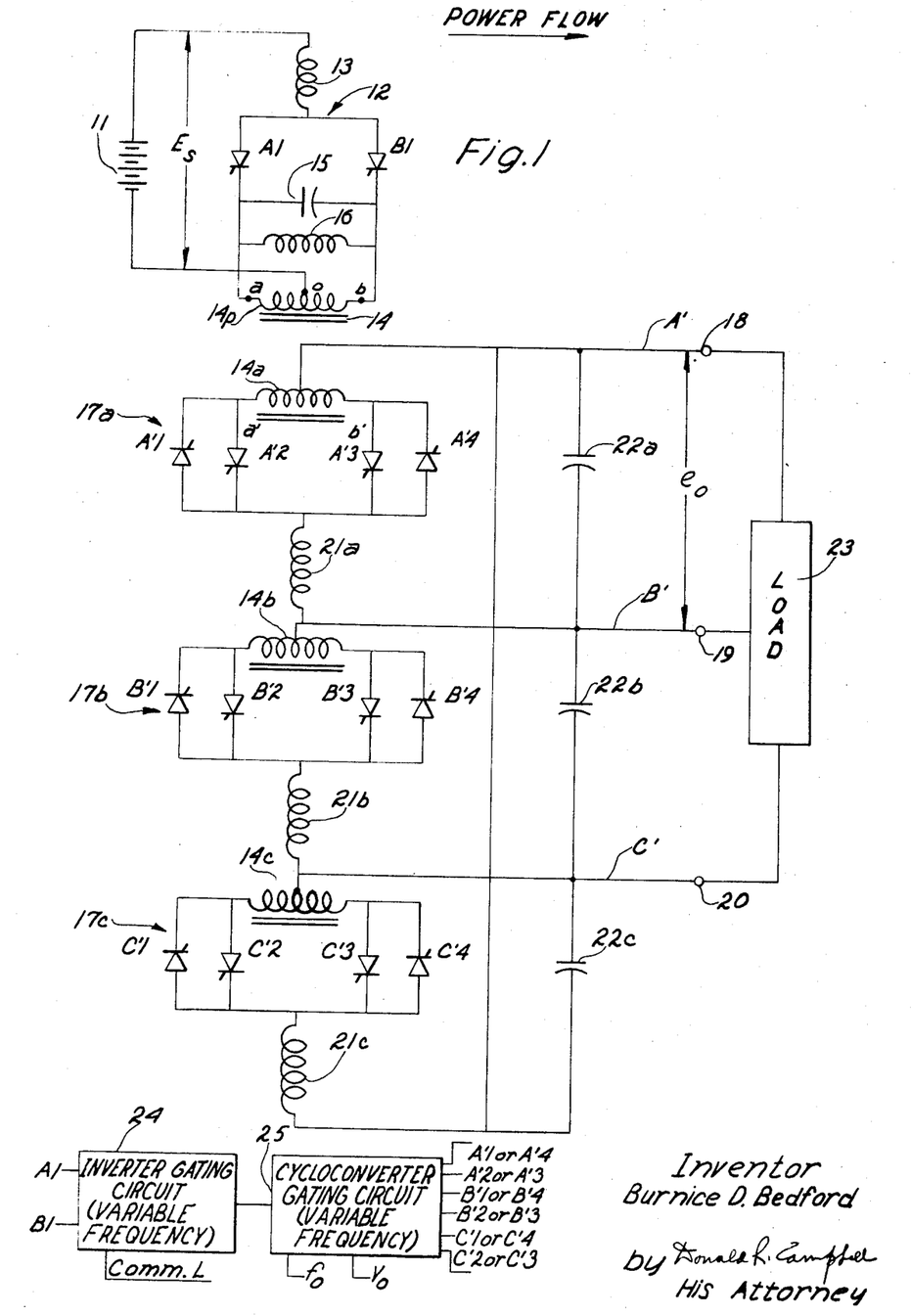
FIG. 1 is a schematic circuit diagram of a power converter constructed according to the teaching of the invention including a parallel capacitor commutated, variable frequency inverter control circuit and delta-connected single phase-to-single phase cycloconverter output circuits for converting d-c input voltage to a variable frequency and voltage polyphase output waveform.

The reliable low cost power conversion system shown in FIG. 1 is a d-c to polyphase a-c power converter which includes a cycloconverter and an inverter for good control of the output voltage and frequency. The power converter is especially suitable for inductive loads such as a polyphase motor. On the input side of the converter, a battery 11 supplies a unidirectional supply voltage $E_s$ to a single phase, parallel capacitor commutated inverter 12. A d-c reactor 13 to limit the current during commutating intervals is connected between the positive terminal of battery 11 and the anodes of a pair of alternately conducting thyristors A1 and B1. The cathodes of thyristors A1 and B1 are respectively connected to each end of the primary winding 14p of a center-tapped high frequency linear coupling transformer 14. The center-tap of the coupling transformer is connected to the negative terminal of battery 11. A parallel resonant commutating circuit is connected between the cathodes of thyristors A1 and B1 and comprises a commutating capacitor 15 and a parallel commutating inductor or inductive reactor 16. As is explained in detail later, the parallel resonant commutating circuit is tuned to a frequency that is normally several times higher than the desired range of output frequencies, and the resonant frequency is preferably relatively high (for example, 1,000-2,000 Hz) as compared to the desired output frequency range (for example, 0-400 Hz). The operating frequency of inverter control circuit 12 is higher than the resonant frequency and is variable to change the inverter commutating angle according to the loads requirements.

The transformer-coupled output switching circuit includes three single phase-to-single phase cycloconverter circuits which are delta-connected to supply a three-phase load. Coupling transformer 14 has three secondary windings 14a, 14b, and 14c, one in each of the single phase cycloconverter output circuits 17a, 17b, and 17c. Each single phase cycloconverter output circuit further includes four thyristors arranged as two inverse-parallel connected pairs. In output circuit 17a, the center-tap of secondary transformer winding 14a is connected to output terminal 18, one end of winding 14a is coupled by means of inverse-parallel thyristors A′1 and A′2 to another output terminal 19, and the other end of winding 14a is coupled to terminal 19 by means of the second thyristor pair A′3 and A′4. Single phase output circuit 17a further includes a series filter inductor 21a preferably connected between output terminal 19 and the adjacent terminals of the four thyristors, and a shunt filter capacitor 22a connected directly between output terminals 18 and 19. The thyristors of the cycloconverter output circuit are selectively phase controlled with respect to the higher inverter frequency to supply the desired voltage $e_o$ and current to load 23. Filter elements 21a and 22a greatly reduce the high frequency ripple produced by the cycloconverter with little adverse effect on the low frequency output. Cycloconverter output circuit 17b is connected between output terminals 19 and 20 and includes a similarly arranged secondary coupling transformer winding 14b, thyristors B′1 to B′4, filter inductor 21b, and filter capacitor 22b. The third delta-connected output circuit 17c is connected between output terminals 18 and 20 and in similar fashion includes secondary winding 14c, thyristors C′1 to C′4, filter inductor 21c, and filter capacitor 22c.

A variable frequency inverter gating circuit 24 alternately supplies gating signals to inverter thyristors A1 and B1 at a selected frequency above the resonant frequency to obtain the desired inverter commutating angle. Inverter gating circuit 24 is preferably a solid state circuit of the type that supplies alternate gating pulses or 180° gating signals to the gate electrodes of the inverter thyristors at a frequency dependent upon the d-c level of an input signal. Suitable gating circuits that can be used are described in the SCR Manual, 4th Edition, published by the Semiconductor Products Department, General Electric Company, Electronics Park, Syracuse, N.Y., copyright 1967. A variable frequency cycloconverter gating circuit 25 is coordinated with the inverter gating circuit 24 to operate at the same pulse frequency, although the gating signal supplied to a particular cycloconverter output circuit thyristor is phase controlled with respect to the higher inverter frequency. Gating circuit 25 is also preferably a solid state circuit controlled by input signal d-c levels that determine the pulse frequency, the output voltage frequency $f_o$, and the magnitude of the output voltage $V_o$, in the manner known in the cycloconverter art. Suitable gating circuits that can be used are described, for example, in the book "Thyristor Phase-Controlled Converters and Cycloconverters," by B.R. Pelly, John Wiley and Sons, copyright 1971. Also see the bibliography of Chapter 11 in the SCR Manual. Gating circuits 24 and 25 comprise the control means for operating the input and output switching circuits in synchronism. In each of the single phase cycloconverter output circuits, it is necessary to supply the gating signals to the particular thyristors that are required to produce the desired output current and voltage. In cycloconverter output circuit 17a, for example, thyristor A′1 or thyristor A′4 is gated on when the output current flows from terminal 19 toward terminal 18, the particular thyristor that is selected being dependent upon the polarity of the voltage pulse applied between terminals 19 and 18. Similarly, thyristor A′2 or thyristor A′3 is gated on for current flow in the other direction from terminal 18 toward terminal 19, the particular thyristor that is chosen being dependent upon whether the voltage is to aid or oppose the current.

Control inverter 12 operates in a manner similar to the ordinary parallel capacitor commutated inverter with the important exception that the amount of commutating energy available from the commutating circuit, which comprises commutating capacitor 15 and parallel commutating inductor 16, varies as the frequency of operation of the inverter is changed. Neglecting the presence of parallel commutating inductor 16 for the moment, and assuming that thyristor B1 is not conducting, turning on thyristor A1 causes the plate of commutating capacitor 15 adjacent to its cathode to charge positively. The commutation of thyristor A1 is initiated by turning on the other thyristor B1, since the commutating capacitor voltage provides a reverse anode-cathode voltage for turning off thyristor A1. On the output side of the converter, the thyristors are commutated by the line commutation mechanism as the inverter voltage supplied to a particular thyristor through coupling transformer 14 changes polarity. When the load 23 being supplied is an inductive load such as an a-c motor, another function of commutating capacitor 15 is to supply current to the load during those portions of each half cycle when the required load current is greater than the current provided by supply. In the most practical circuits, a commutation is obtained when the capacitor KVA exceeds the inductive load KVA. Under light load conditions, such as a resistance load or a small motor, a relatively small commutating capacitor is sufficient to meet voltage requirements. On the other hand, a relatively heavy load such as a large motor or a relatively large high power factor inductive load requires a large commutating capacitor. Also the wave shape and magnitude of the output voltage are changed quite radically if the inductive load is removed while the same capacitance value is retained.

The effect of adding the parallel commutating inductor 16 and operating the inverter at a frequency greater than the resonant frequency of commutating capacitor 15 and inductor 16 is to vary the reactive KVA supplied by the commutating circuit. The resulting leading reactive KVA is the correct amount to supply the lagging load of the cycloconverter in addition to the commutating requirements of the inverter. The basis for this is that the capacitive reactance is equal to the inductive reactance at the resonant frequency of the parallel resonant commutation circuit. At a frequency higher than the resonant frequency, however, the capacitive reactance is less than the inductive reactance, and the ratio of the capacitive reactance to the inductive reactance decreases as the frequency of driving the parallel resonant circuit is increased. Therefore the larger current charges capacitor 15 to a higher voltage. Control of the operating frequency of inverter 12 consequently varies the amount of commutating energy available from the parallel commutating circuit, since the voltage to which commutating capacitor 15 is charged becomes higher as the operating frequency is increased and thus provides a larger inverter commutating angle.

Frequency is a very effective control of reactive KVA as illustrated by the following simple example. Assume the cycloconverter is operating with a light load. The input power is also very small. The capacitive KVA requirements of the inverter circuit are small. Under this condition, inverter gating circuit 24 is supplied with a d-c input signal indicative of a relatively small commutation angle and drives inverter 12 at a frequency which is always slightly higher than the resonant frequency of commutating capacitor 15 and inductor 16. The capacitive KVA of commutating capacitor 15 is only slightly greater than the inductive KVA of commutating circuit inductor 16. The net difference supplies the small capacitive requirements of the light load. When the load is increased and the capacitive KVA requirements of the cycloconverter and the inverter are increased, the frequency of the inverter is increased for example two to one. The inductive KVA effect of inductor 16 is reduced two to one while the capacitive KVA effect of capacitor 15 is increased two to one. Three-fourths of this higher frequency rating of commutating capacitor 15 is available to supply the capacitive requirements of the load and for commutating the inverter. At very light load parallel commutating inductor 16 is effective in circulating the capacitive current which is not needed by the load and inverter. When more capacitive KVA is needed, the capacitive reactance is decreased by higher frequency operation while at the same time the inductive reactance is increased. The result is a very effective control of the reactive requirements of the high frequency portion of the circuit.

Figure 2A:
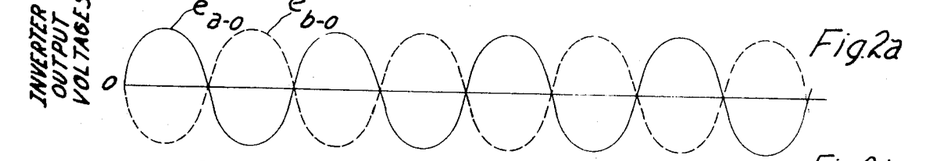
FIGS. 2a to 2f are waveform diagrams useful in explaining the operation of the FIG. 1 and other converters.

Referring to the inverter output voltage waveforms shown in FIG. 2a, the effect of adding parallel commutating inductor 16 to the commutating circuit is that the inverter output voltages are sine-like rather than squarish as in the ordinary parallel capacitor commutated inverter. The voltages $e_{a-o}$ and $e_{b-o}$ developed across the two halves of primary winding 14p of center-tapped coupling transformer 14 are 180° out of phase. The wave shape is more sineish at lower frequencies with a substantial amount of third harmonic and is more squarish at higher frequencies. The resulting complex wave shape, although not an ideal sine wave, can be phase controlled by the cycloconverter output circuits 17a to 17c to obtain the desired lower frequency output voltage.

Figure 3:
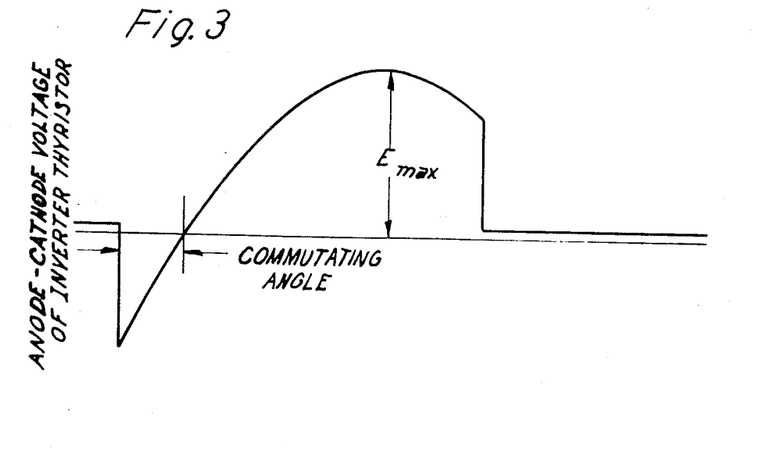
FIG. 3 is a waveform diagram of the anode-cathode voltage of an inverter thyristor illustrating the inverter commutating angle.

The concept of changing the inverter commutating angle is clarified by reference to FIG. 3. FIG. 3 shows the anode-cathode voltage of one of the inverter thyristors. To commutate off a thyristor, as is well known, a reverse anode-cathode voltage is applied to the devices. The voltage across the device after forward voltage blocking capability is returned rises to several times the supply voltage. Upon being rendered conductive, there is a small positive voltage drop across the device. The inverter commutating angle is the time interval immediately following conduction when negative anode-cathode voltage appears across the thyristor. The commutating angle is approximately equal to the circuit power factor angle. For a more detailed discussion the reader is referred to the book, "Principles of Inverter Circuits" by Bedford and Hoft, John Wiley and Sons, Inc., copyright 1964.

In general, the inverter operating frequency is controlled to attain a desirable commutating angle in the range of 10°–30°. One way of setting the commutating angle automatically is with reference to the maximum anode-cathode voltage $E_{max}$ which is approximately equal to three to four times the d-c supply voltage. A commutating angle of about 30° is obtained by firing the other thyristor at about one-half $E_{max}$ as the anode-cathode voltage falls from its maximum value to zero. By firing at one-third $E_{max}$, a commutating angle of 20° is obtained, and by firing at one-quarter $E_{max}$ a commutating angle of 10° is obtained. In this manner, inverter gating circuit 24 can be arranged to fire at a selected angle after the maximum anode-cathode voltage is reached. Another technique is to look at the d-c level of the anode-cathode voltage. It is expected that the commutating angle will be set to an appropriate value known to be suitable for the load being supplied, but it is also possible to have a feedback technique that automatically measures the circuit power factor and sets the proper commutating angle.

Figures 2B, 2C:
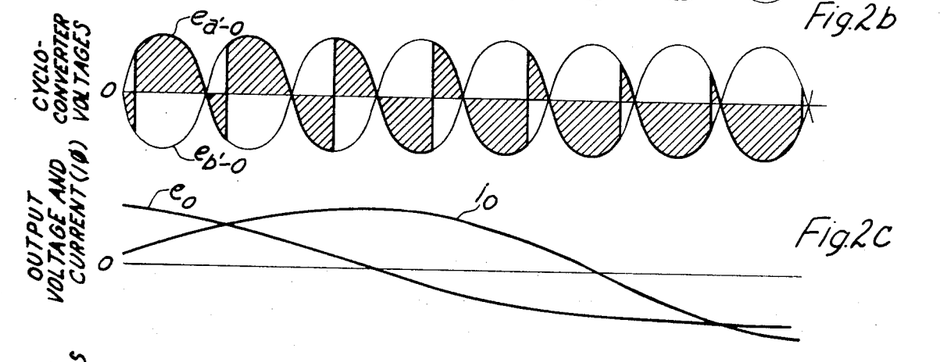

FIG. 2b–2f are waveforms illustrative of the operation of a single phase cycloconverter output circuit for two different operating frequencies of control inverter 12. The output wave shapes produced at terminals 18 to 20 are conventional three-phase voltages and currents whose frequency and magnitude can be varied independently of one another by well-known cycloconverter techniques. A principal application of this type of power converter circuit is the variable speed control of a-c machines, such as a polyphase induction motor, which requires that the a-c voltage be reduced as the frequency of the power supplied to the motor is decreased in order to supply constant flux to the machine. As has been previously mentioned, the output voltages of inverter 12 are the sine-like, 180° out-of-phase voltages shown in FIG. 2a that have a frequency determined by the frequency of turning on and off thyristors A1 and B1. These high frequency voltages are coupled to cycloconverter output circuits 17a to 17b by means of the respective secondary windings 14a to 14c of isolating transformer 14. The thyristor switches in the three single phase cycloconverter output circuits are controlled independently of one another to produce the desired voltage and current at its respective pair of output terminals. The principles of obtaining a single phase output voltage with the selected frequency and voltage magnitude by controlling the thyristors in a single phase cycloconverter circuits, such as circuit 17a, is illustrated in FIG. 2b. FIG. 2c shows the filtered output voltage $e_o$ and the corresponding output current $i_o$. As was previously mentioned, thyristors A′1 and A′4 are used to obtain one polarity of output current while thyristors A′2 and A′3 obtain the other polarity of output current. The selection between thyristors A′1 and A′4 and between thyristors A′2 and A′3, depends upon whether the output voltage pulse is to aid the current or reduce the current. In FIG. 2b, the available 180° out-of-phase voltages (a unity turns ratio is assumed) across the two halves of secondary windings 14a are identified as $e_{a'}$ $_{-o}$ and $e_{b'}$ $_{-o}$. The firing angles of the appropriate thyristors are continuously modulated to obtain the output voltage with the desired frequency and magnitude. In corresponding half cycles of voltages $e_{a'}$ $_{-o}$ and $e_{b'}$ $_{-o}$, the sequential negative and positive voltage segments that are produced are shown as the shaded areas.

Figure 2D:
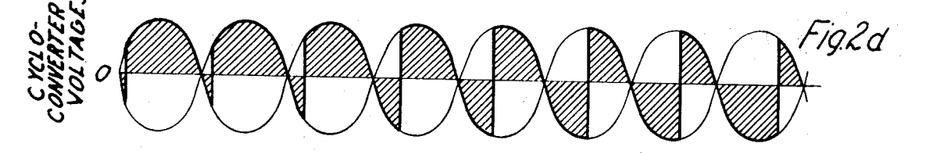
Figure 2E:
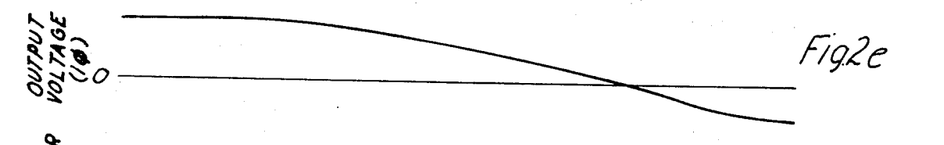
Figure 2F:
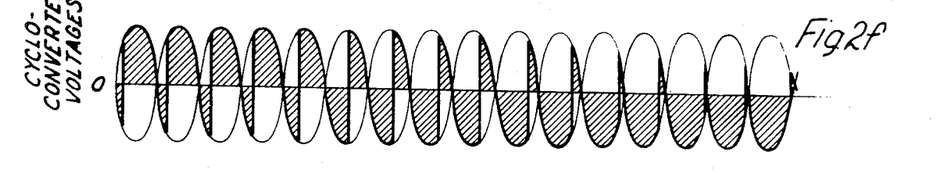

The net voltage produced after filtering by filter components 21a and 22a is the difference between the two shaded areas. The net difference corresponding to the output voltage $e_o$ decreases from left to right, passes through zero after the third complete half cycle, and then becomes increasingly more negative as the output voltage becomes more negative. Control of the magnitude of the output voltage is obtained by modulating the firing angles more or less about the 90° point in each half cycle. Control of the frequency and magnitude of the output voltage are independent of one another. In FIG. 2d the operating frequency of inverter 12 is the same as in FIG. 2b, but the modulation of the firing angles of the appropriate thyristors is changed to produce the lower frequency output voltage shown in FIG. 2e. In FIG. 2f the operating frequency of inverter 12 is twice that shown in FIG. 2b, but the modulation of the firing angles of the appropriate thyristors is changed to produce the same output voltage as is shown in FIG. 2c.

The d-c to a-c power converter of FIG. 1 is a reliable low cost power conversion system that offers a wide control range with high efficiency. As compared to other power converters that obtain a variable frequency and magnitude output voltage, only a relatively small number of thyristors are required. The output can be used to operate a-c motors over both a wide range of speed and torque. When lightly loaded, the ability to commutate large loads is maintained in reserve in a very efficient circuit. A simple control circuit makes this reserve commutating ability available for rapid increases in load. The fast control circuit also limits the voltage when the load is suddenly increased. The overall power factor is improved as well as efficiency since the commutating energy is a function of load rather than being at the level required for maximum load. This embodiment of the power converter is suitable for power flow in only one direction, from the source in the direction of the load. Although here shown as being implemented with thyristors, more particularly silicon controlled rectifiers, a variety of solid state switching devices can be used. The circuit can be constructed with a variety of different types of thyristors, such as the triac or diac, and is also useful with power transistors since it has been found that more efficient operation can be obtained by the use of a suitable commutation circuit.

Figure 4:
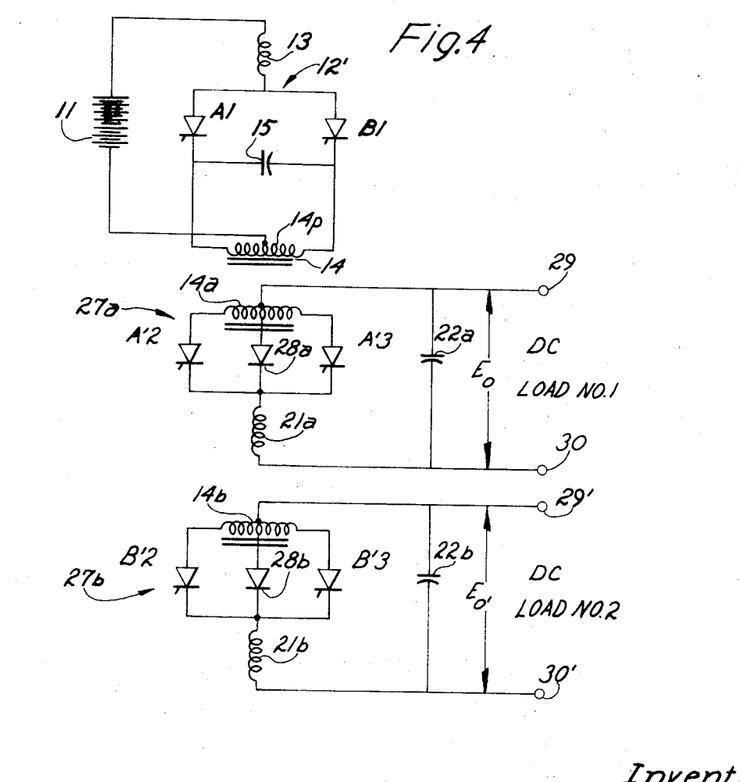
FIG. 4 is a d-c to d-c converter based on the FIG. 1 circuit for supplying one or more d-c loads.

It is evident with reference to FIG. 1 that a d-c to single phase a-c power converter is achieved by using only one of the single phase-to-single phase cycloconverter output circuits. The modification of FIG. 1 shown in FIG. 4 is a d-c to d-c power converter having one or more phase controlled rectifier output circuits for supplying adjustable d-c voltage to one or more d-c loads. In the input switching circuit, parallel capacitor commutated inverter 12′ is similar to inverter 12 (FIG. 1) with the exception that high frequency coupling transformer 14 has the dual function of being the isolating transformer and also of providing the parallel commutating inductance for the parallel resonant commutating circuit. Thus, the separate parallel commutating inductor 16 is eliminated. The first phase controlled rectifier output circuit 27a comprises only the two similarly poled thyristors A′2 and A′3 connected between either end of secondary transformer winding 14a and the adjacent terminal of filter inductor 21a. A coasting diode 28 is additionally connected between the center-tap of secondary winding 14a and the same terminal of filter inductor 21a. This diode provides a path for the discharge of inductive energy, and achieves a substantial reduction in reactive KVA when the output circuit is controlled for low output voltage. By alternately phase controlling thyristors A′2 and A′3 by variable amounts, an adjustable d-c voltage $E_o$ is produced between output terminals 29 and 30. The independently controlled phase controlled rectifier output circuit 27b is identical to output circuit 27a and is capable of producing a different d-c output voltage $E_o'$ between terminals 29′ and 30′. The high frequency control inverter 12′ in FIG. 4 is operated at a variable frequency as previously explained to control the commutating angle and reactive KVA for commutation purposes. Increasing the operating frequency produces a larger commutating angle and a larger amount of capacitive KVA. The use of a larger commutating angle also increases the inverter voltage. The output voltage is largely controlled by phase control of the output rectifier circuits, however, the inverter commutating angle can be increased above normal to obtain some increase in the d-c output voltage. Power flow in the other direction from the load toward the source is possible by reversing the polarity of both the input and output d-c voltages.

Figure 5:
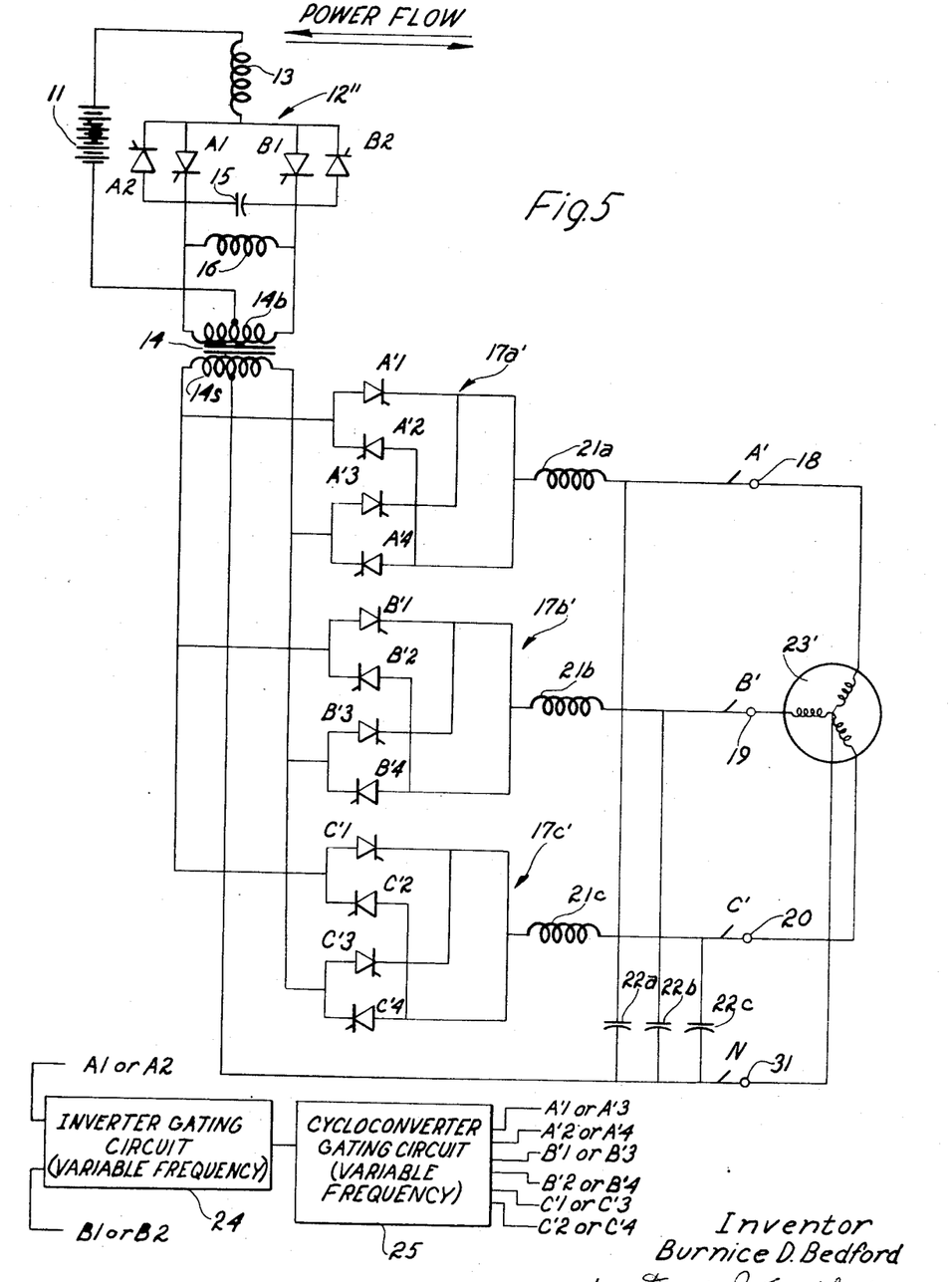
FIG. 5 is a modification of the FIG. 1 converter that uses a wye-connected cycloconverter output circuit and has bidirectional switches in the inverter control circuit to provide reverse power flow capability.

The embodiment of the new power converter illustrated in FIG. 5 is equipped for power flow in both directions and has an output circuit with three single phase-to-single phase cycloconverter units that are wye-connected to supply a three-phase, four wire low frequency load. High frequency control inverter 12″ is identical to inverter 12 in FIG. 1 with the exception that additional inverter thyristors A2 and B2 are respectively connected in inverse-parallel with thyristors A1 and B1. These enable reverse current flow through the inverter in the rectifier mode. In the three-phase output switching circuit, a single center-tapped secondary transformer winding 14s supplies voltage to the single phase-to-single phase cycloconverter circuits 17a′ to 17c′. Each of these cycloconverter output units are functionally equivalent to the cycloconverter output circuits shown in FIG. 1 and include four thyristors arranged in two anti-parallel pairs, a series filter inductor, and a shunt filter capacitor identified by the same numerals. The center-tap of secondary transformer winding 14s is connected to the neutral output terminal 31, and filter capacitors 22a to 22c are more particularly connected between the respective output lines A′, B′, and C′ and the N terminal. The operation of the power converter to provide forward current flow through the circuit to supply load 23′ from source 11 is virtually identical to the operation of the FIG. 1 circuit and need not be repeated.

When load 23′ is a regenerative load such as a traction or hoist motor or a trolley motor running down hill, the load generates power that is returned to the source. In this case, reverse current flow capability is required. It is well known that the phase controlled cycloconverter is capable of four quadrant operation, and has the inherent property of being able to handle loads of any power factor. Power is free to flow in either direction through the cycloconverter, and thus operation is possible with both passive and regenerative loads. When power flow is reversed, the cycloconverter thyristors operate as an inverter with respect to the normal output circuit. This inverter action predominates when the load feeds power back to the d-c supply circuit. Referring to cycloconverter circuit 17a′, thyristors A′2 and A′4 are operated alternately in inverter fashion when the reverse voltage at line A′ has a positive polarity, and the other two thyristors are used for negative polarity reverse voltage. Commutating energy for the cycloconverter thyristors is supplied by commutating capacitor 15 through coupling transformer 14. The operating frequency of the cycloconverter thyristors when operated in inverter mode during reverse current flow is controlled in the same manner to obtain the desired commutating angle and to control the net reactive KVA in the inverter action of the circuit. In the same manner as before, parallel commutating inductor 16 circulates excess current supplied by commutating capacitor 15. As was mentioned, the extra thyristors A2 and B2 in control inverter circuit 12″ operate as a phase controlled rectifier in the reverse current flow mode. In this way power is returned to battery 11. Of course, inverter gating circuit 24 and cycloconverter gating circuit 25 are equipped to operate their respective circuits in the modified manner for reverse current flow upon the sensing of a power generating load.

Figure 6:
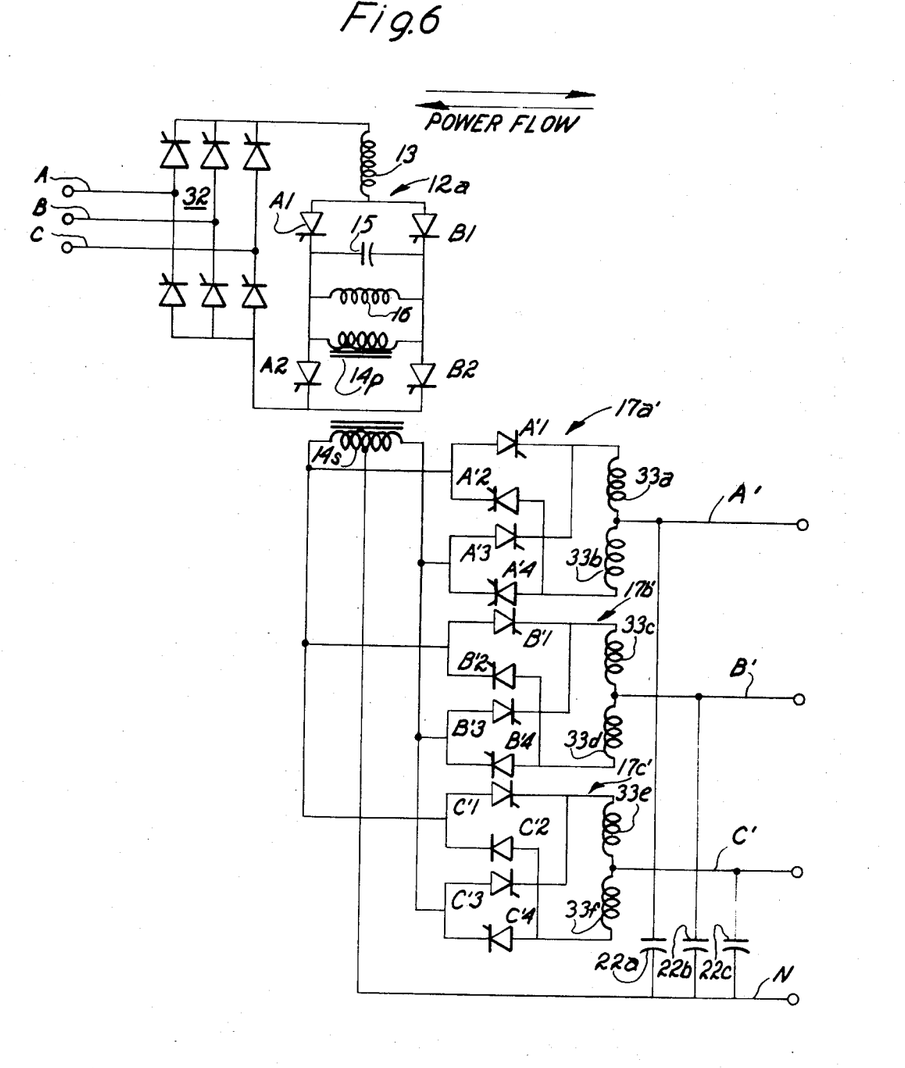
FIG. 6 is a modification of FIG. 5 including a phase controlled bridge rectifier operating from an a-c supply, a full wave bridge inverter, and divided output filter inductors that can be coupled in different ways to produce different output voltages.

FIG. 6 is a modification of the power converter of FIG. 5 and illustrates some of the other options that are possible with respect to the d-c supply, the high frequency control inverter, and the cycloconverter output circuit. The filter inductors in the cycloconverter output circuits are arranged to obtain rectangular current waves when the inverter operating frequency is only a little higher than the desired output frequency. The d-c supply comprises a polyphase bridge rectifier 32 having input lines A, B, and C connected to an available source of polyphase a-c voltage. Rectifier 32 is phase controlled to adjust the d-c input voltage to the circuit, and is operative in the reverse current flow mode to return power to the source. Control inverter 12a is constructed in the full wave bridge configuration and includes the two extra thyristors A2 and B2 for reverse power flow capability. In the forward current flow direction, the circuit is operated as an inverter by simultaneously gating thyristors A1 and B2, and alternately gating thyristors B1 and A2. This circuit is also operable as a phase controlled rectifier when power is returned to the source.

Single phase-to-single phase cycloconverter output circuits 17a′ to 17c′ are identical to those shown in FIG. 5 with the exception of the arrangement of the filter inductors. The output filter reactors 33a to 33f include a total of six windings and the coupling of these windings can be designed for several modes of operation. In output circuit 17a′, filter inductors 33a and 33b are each connected between output line A′ and the respective pairs of thyristors that are poled in the same direction. When only the two windings connected to an output line are closely coupled, the circuits can be operated to supply 180° square current waves to the output lines. When the six windings are coupled in two groups of three windings, the circuits can be used to supply 120° square current waves to the output lines. This arrangement is suitable, as was previously mentioned, when the operating frequency of inverter 12a is only a little higher than the output frequency. The reactive KVA requirements of the inverter are reduced when phase control is not used for the large amount of voltage control required to produce a close approach to a sine wave. The arrangement of the filter inductors and the phase control of these cycloconverters can be designed to meet the requirements of the particular application.

Figure 7:
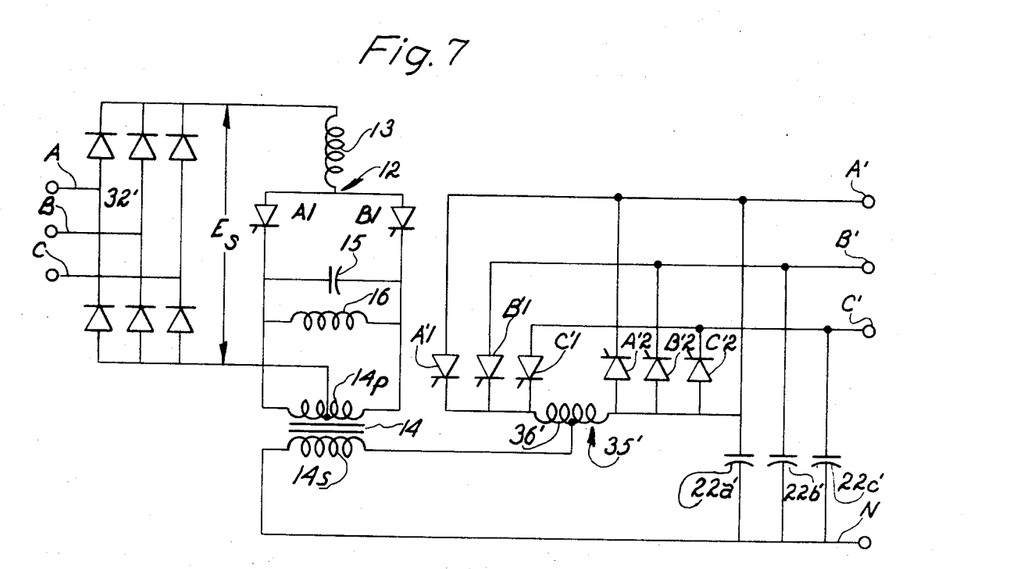
FIG. 7 is a schematic circuit diagram of another embodiment of the invention comprising the inverter control circuit of FIG. 1 and a simple half wave cycloconverter output circuit.

The embodiment of the invention shown in FIG. 7 is an a-c to a-c power converter with a very simple half wave cycloconverter output circuit. This power circuit is suitable for small motor applications and is thus useful when the inverter operating frequency is relatively high as compared to the desired range of output frequencies. A constant d-c supply voltage $E_s$ is supplied to inverter 12 by a full wave diode bridge rectifier 32′ connected to a commercially available source of polyphase a-c voltage. Control inverter 12 is identical to the inverter illustrated in the FIG. 1 embodiment, however high frequency coupling transformer 14 has only a single secondary winding 14s that is not center-tapped. The three-phase, half wave cycloconverter output circuit 35′ uses only six phase controlled thyristors and is wye-connected to supply a three phase, four wire low frequency load. Secondary transformer winding 14s is connected between the center-tap of a current circulating reactor 36′ and the neutral output terminal N. The first group of thyristors A′1, B′1, and C′1 are connected between one end of current circulating reactor 36′ and the respective output lines A′, B′, and C′. The other group of thyristors A′2, B′2, and C′2 are poled in the opposite direction and likewise connected between the respective output lines and the other terminal of current circulating reactor 36′. The separate shunt filter capacitors 22a' to 22c' are provided, but reactor 36' has the dual function of being a filter inductor since a separate output filter inductor is not provided in this circuit.

The operation of inverter 12 is identical to that already explained with regard to FIG. 1. The output wave shape produced by this converter depends upon the configuration of the filter. The control of the output frequency and the magnitude of the polyphase output voltage is obtained in the same manner as for the full wave cycloconverter output circuits, by modulating the firing angles of the phase controlled thyristors. Each group of three thyristors can operate only on one-half cycle of the voltage appearing across secondary transformer winding 14s. This circuit is suitable for small power applications where the simplicity of a few output solid state switches is more important than the extra filter required to remove the large ripple from the output circuit. The filter requirements are not excessive when the inverter operating frequency is high relative to the output frequency. Only a single direction of power flow is possible with this circuit, in the direction to supply the load from the source.

Figure 8:
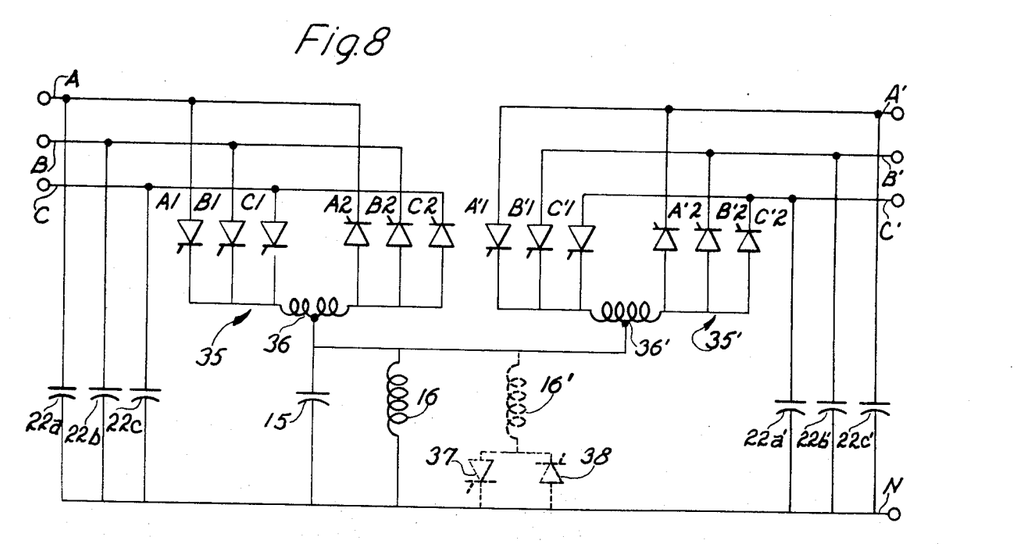
FIG. 8 is a schematic circuit diagram of yet another embodiment without the isolating transformer that features symmetrical inverter and cycloconverter circuits for both forward and reverse power flow. The inverter reactive KVA for commutation is controlled by varying the inverter frequency, as in the foregoing circuits, or by operating at a constant inverter frequency and using the phase controlled auxiliary commutating inductor illustrated in dashed lines to control the reactive KVA.

The FIG. 8 embodiment is symmetrical for power flow in either direction. This form of the power converter has identical input and output switching circuits of the type shown in the half wave cycloconverter output circuit 35' in FIG. 7, and uses no isolation transformer 14 between the inverter portion of the circuit and the cycloconverter output circuit. The inverter commutating angle is controlled as heretofore explained by varying the operating frequency of the inverter portion of the circuit, or the inverter frequency can remain constant while the parallel commutating inductance is changed by using the phase controlled inductor circuit shown in dotted lines. This circuit is also suitable for smaller power applications. As was mentioned, output switching circuit 35' is identical to the FIG. 7 output circuit. Input switching circuit 35 is the mirror image of the output switching circuit and includes the first group of thyristors A1, B1, and C1, and the second group of oppositely poled thyristors A2, B2, and C2, with a dual function current circulating and filter reactor 36 connected between the cathodes of one group of thyristors and the anodes of the other group. The parallel resonant commutating circuit comprising commutating capacitor 15 and parallel commutating inductor 16 is connected directly between the center-taps of the two reactors 36 and 36' and the neutral output terminal N. Input switching circuit 35 further includes the three shunt input filter capacitors 22a to 22c connected between the input lines A, B, and C and the neutral output terminal N.

In the usual mode of operation in which power is supplied to the load, input switching circuit 35 is operated as a variable frequency inverter. The plate of commutating capacitor 15 connected to the center-tap of reactor 36 is alternately connected to a positive going input line and to a negative going input line. In analyzing the operation of input circuit 35 as an inverter it will be recognized that this is another way of drawing a conventional full wave bridge rectifier, such as rectifier 32 in FIG. 6 with the reactor 36 between the two d-c terminals. In the common mode of operation, one thyristor in the first group of thyristors whose anode is connected to a positive going input line is operated in conjunction with one of the thyristors in the second group of thyristors whose cathode is connected to a negative going input line. Forced commutation of a conducting thyristor by the parallel capacitor commutation technique utilizing the voltage on commutating capacitor 15 is still required since the operating frequency of the inverter is relatively high as compared to the frequency of the polyphase a-c supply voltage. Cycloconverter output circuit 35' is operated in the same manner as in the FIG. 7 circuit to produce a polyphase output with the desired frequency and voltage. For reverse current flow operation, it is obvious in view of the symmetry of the power converter that switching circuit 35' is operated as a variable frequency inverter whereas switching circuit 35 is now operated as a cycloconverter output circuit.

The modification illustrated in dotted lines in FIG. 8 controls the inverter commutating angle by operating the inverter at a constant frequency and inserting a variable amount of auxiliary commutating inductance in parallel with the existing parallel commutating inductor 16. This varies the total amount of parallel commutating inductance and achieves control of the reactive KVA for commutation purposes in the same manner as changing the inverter operating frequency. To this end, there is inserted across commutating inductor 16 the series circuit comprising an auxiliary commutating inductor 16' and a pair of inverse-parallel thyristors 37 and 38. By phase controlling thyristors 37 and 38 in synchronism with the commutating circuit voltage, the effective inductance inserted in parallel with inductor 16 is adjusted. An increase in the inductive reactance of the commutating circuit reduces the inverter commutating angle. The switching circuit 35 or 35' functioning as an inverter can be operated as a single switch inverter when the operating frequency is equal to the resonant frequency of the parallel resonance circuit comprising commutating capacitor 15 and commutating inductor 16. In this mode of operation, one of the thyristors connected to a positive going input or output line is turned on at 180° intervals of the parallel resonant commutating circuit frequency. The particular advantages of the power converter configurations of FIG. 8 are that the high frequency coupling transformer 14 is not required, and that the circuit is completely symmetrical for power flow in either direction using a relatively small number of solid state switches. This circuit is advantageous for small motor applications.

Although not here illustrated, other embodiments of the solid state power converter can be constructed with full wave cycloconverter input and output circuits based on the cycloconverter output circuit shown in FIG. 1. Such a converter utilizes three high frequency coupling transformers rather than only one coupling transformer as shown in FIG. 1, and all the cycloconverter unit circuits on both sides are identical except that on one side each unit includes a parallel commutating capacitor. In similar fashion, the input and output side cycloconverters can have the form shown in FIG. 5, in which case only a single coupling transformer is needed. The parallel commutating inductance can be supplied by the coupling transformer if desired.

In summary, a new family of high-frequency-link power converters are characterized by parallel capacitor commutated switching circuits that are operated to vary the available commutating energy as a function of load. The converters may be used with either d-c input power or a-c input power, and can produce variable d-c output voltage or controlled single phase or polyphase a-c output voltage. The a-c output voltages are controllable over a wide range as to frequency, magnitude, and wave shape. The input switching circuit is most commonly in the inverter configuration while the output switching circuit has a cycloconverter configuration. Other power converters, however, have cycloconverter-type input and output circuits, while the converter for producing a d-c output voltage includes a phase controlled rectifier output circuit. Some of the power converters permit power flow in both directions and can be used with regenerative loads. The new power circuits are reliable and relatively low cost. When lightly loaded, the ability to commutate large loads is held in reserve in a very efficient commutating circuit. In addition, overall power factor is improved as well as efficiency since the available commutating energy is a function of load rather than being at the level required for maximum load. These converters are especially suitable for variable speed a-c motor applications.

While the invention has been particularly shown and described with reference to several preferred embodiments thereof, it will be understood by those skilled in the art that the foregoing and other changes in form and details may be made therein without departing from the spirit and scope of the invention.

What I claim as new and desire to secure by Letters Patent of the United States is:

1. A versatile power converter circuit comprising
   a first switching circuit including a plurality of solid state switches for converting an electric potential to a higher frequency voltage wave,
   a second switching circuit including a plurality of phase controlled solid state switches for converting the higher frequency voltage wave to a desired output voltage waveform,
   tuned parallel capacitor commutation circuit means for supplying a controlled variable amount of commutation energy for turning off said solid state switches in said switching circuits, said commutation circuit means comprising a commutation capacitor and parallel commutating inductance means tuned to a predetermined constant resonant frequency, and
   control means for operating said first and second switching circuits in synchronism.

2. A circuit according to claim 1 wherein said control means operates said switching circuits and said tuned parallel capacitor commutation circuit means at a selected operating frequency greater than the resonant frequency, to thereby increase the amount of commutating energy as the operating frequency is increased.

3. A circuit according to claim 1 wherein said control means operates said switching circuits and said tuned parallel capacitor commutation circuit means at a substantially constant operating frequency, and
   said commutation circuit means further includes variable auxiliary parallel commutating inductance means for controlling the amount of commutating energy available from said commutation circuit means.

4. A circuit according to claim 3 wherein said first and second switching circuits are cycloconverter configuration circuits and said commutation circuit means is coupled therebetween.

5. A circuit according to claim 3 wherein said first and second switching circuits are polyphase cycloconverter circuits, and said commutation circuit means is coupled therebetween,
   said power converter circuit being operative to convert a polyphase electric potential to a variable frequency, variable voltage output waveform.

6. A versatile power converter circuit comprising
   a first switching circuit including a plurality of solid state switches for converting an electric potential to a high frequency voltage wave as compared to the frequency of a desired output voltage waveform,
   a second switching circuit including a plurality of solid state switches that are phase controlled to convert the high frequency voltage wave to the desired output voltage waveform,
   tuned parallel capacitor commutation circuit means connected in said first switching circuit for supplying a controlled variable amount of commutating energy for turning off said solid state switches in said switching circuits, said commutation circuit means comprising a commutation capacitor and parallel commutating inductance means tuned to a predetermined constant resonant frequency, and
   control means for operating said switching circuits in synchronism at a variable operating frequency greater than said resonant frequency to thereby vary the net capacitive reactance of said commutation circuit means.

7. A circuit according to claim 6 wherein said power converter circuit further includes a coupling transformer for coupling the high frequency voltage wave to said second switching circuit.

8. A circuit according to claim 7 wherein said parallel commutating inductance means is provided by the inductance of said coupling transformer.

9. A circuit according to claim 7 wherein said first switching circuit is an inverter and said second switching circuit is a cycloconverter for producing a variable frequency, variable voltage output waveform.

10. A circuit according to claim 9 wherein said inverter is a single phase inverter connected to a source of unidirectional voltage, and said cycloconverter comprises a plurality of single phase-to-single phase cycloconverter circuits for producing a variable frequency, variable voltage polyphase output waveform.

11. A circuit according to claim 6 wherein said first switching circuit is a single phase inverter connected to a source of unidirectional voltage, and said second switching circuit comprises at least one phase controlled rectifier for producing a variable unidirectional output voltage.

12. A circuit according to claim 11 wherein said power converter circuit further includes a high frequency coupling transformer for coupling the high frequency voltage wave produced by said single phase inverter to said phase controlled rectifier, and wherein said second switching circuit additionally includes a second phase controlled rectifier coupled to said high frequency coupling transformer for producing another independently variable unidirectional output voltage.

13. A circuit according to claim 6 wherein said first and second switching circuits are polyphase cycloconverter circuits for converting a polyphase electric potential to a variable frequency, variable voltage polyphase output waveform, and wherein both of said cycloconverter circuits are symmetrical half wave cycloconverter circuits.

14. A versatile power converter circuit comprising
   a high frequency linear coupling transformer having a primary winding and inductively coupled secondary winding means,
   a single phase inverter circuit coupled to said primary winding including a plurality of solid state switches for converting an electric potential to a high frequency voltage wave,
   a cycloconverter circuit coupled to said secondary winding means including a plurality of solid state switches for converting the high frequency voltage wave to a desired low frequency polyphase output voltage waveform,
   tuned parallel capacitor commutation circuit means connected in said inverter circuit for supplying a controlled variable amount of commutating energy for turning off said solid state switches, said commutation circuit means comprising a commutation capacitor and parallel commutation inductance means tuned to a predetermined resonant frequency, and
   control means for operating said inverter and cycloinverter circuits in synchronism at a variable operating frequency greater than the resonant frequency to thereby control the net capacitive reactance of said commutation circuit means according to the load requirements.

15. A circuit according to claim 14 wherein said commutating inductance means is provided by the inductance of said high frequency coupling transformer, and said commutation capacitor is connected across at least a portion of the primary winding thereof.

16. A circuit according to claim 14 wherein said single phase inverter circuit includes additional solid state switches connected to obtain reverse current flow capability.

17. A circuit according to claim 14 wherein said single phase inverter circuit is constructed in the full bridge circuit configuration, and said commutation circuit means is connected across at least a portion of the primary winding of said high frequency coupling transformer.

18. A circuit according to claim 14 wherein the secondary winding means of said high frequency coupling transformer comprises three center-tapped secondary windings, and
   said cycloconverter circuit comprises three delta-connected single phase-to-single phase cycloconverter circuits each coupled to one of said secondary windings.

19. A circuit according to claim 18 wherein each single phase-to-single phase cycloconverter circuit comprises bidirectional conducting solid state switches connected to each end of its respective secondary winding, series filter inductor means, and shunt filter capacitor means.

20. A circuit according to claim 14 wherein the secondary winding means of said high frequency coupling transformer comprises a single center-tapped secondary winding, and
   said cycloconverter circuit comprises three wye-connected single phase-to-single phase cycloconverter circuits each coupled to said secondary winding.

21. A circuit according to claim 20 wherein each single phase-to-single phase cycloconverter circuit comprises bidirectional conducting solid state switches connected to each end of said secondary winding, series filter inductor means, and shunt filter capacitor means.

22. A circuit according to claim 14 wherein the secondary winding means of said high frequency coupling transformer comprises a single secondary winding, and
   said cycloconverter circuit is a three-phase, half wave cycloconverter circuit.

23. A circuit according to claim 22 wherein said three-phase, half wave cycloconverter circuit comprises a center-tapped reactor connected at its center tap to said secondary winding, first and second groups of said solid state switches respectively connected between each output terminal and either end of said reactor, and filter capacitor means.

24. A versatile power converter circuit comprising
   a first cycloconverter circuit including a plurality of solid state switches operated to convert a low frequency polyphase electric potential to a high frequency voltage wave,
   a second cycloconverter circuit including a plurality of solid state switches for converting the high frequency voltage wave to a desired low frequency polyphase output voltage waveform,
   a tuned parallel capacitor commutation circuit coupled between said first and second cycloconverter circuits for supplying a controlled variable amount of commutating energy for turning off said solid state switches in said cycloconverter circuits, said tuned commutation circuit comprising a commutation capacitor and a parallel commutating inductor tuned to a predetermined resonant frequency, and
   control means for operating said first and second cycloconverter circuits in synchronism at a variable operating frequency greater than the resonant frequency to thereby control the net capacitive reactance of said tuned commutation circuit according to the load requirements.

25. A circuit according to claim 24 wherein said first and second cycloconverter circuits are symmetrical and are both half wave cycloconverter circuits.

26. A circuit according to claim 25 wherein each of said half wave cycloconverter circuits includes two groups of oppositely poled solid state switches respectively connected between a circuit terminal and either end of a center-tapped reactor, and further includes filter capacitor means,
   said commutation circuit being connected between a neutral circuit terminal and the center-tap of each reactor.

* * * * *